Sept. 9, 1958 L. R. ALISON 2,850,780
FISH FASTENER
Filed Dec. 7, 1953

INVENTOR
LELAND R. ALISON
BY Williamson, Williamson
Schroeder & Adams
ATTORNEYS

United States Patent Office 2,850,780
Patented Sept. 9, 1958

2,850,780

FISH FASTENER

Leland R. Alison, Detroit Lakes, Minn.

Application December 7, 1953, Serial No. 396,573

4 Claims. (Cl. 24—161)

This invention relates to fish fasteners. More particularly, it relates to devices of the type known as fish stringers for securing and holding a plurality of fish in the water while the fisherman continues his fishing operations.

The conventional fish stringer is comprised of a metal chain having a plurality of snap fasteners secured thereto at spaced points along its length. These snap fasteners are normally of the safety pin type of construction in that they are constructed to have cooperating free ends, one of which has a latch member formed thereon and the other of which is resiliently urged away from the latch member so that, when it is inserted into the latch member, it will remain fastened and will securely hold the fish impaled thereon. Such fasteners must necessarily be quite strongly resilient in order to preclude their becoming unfastened while the boat to which the stringer is attached moves among weeds, rushes and the like. As a result when a relatively large fish is caught and it is unsafe because of the size of the fish to permit the fish to lie upon the bottom of the boat for fear the fish will flop out of the boat and escape, it is an extremely difficult task to hold the fish in one hand and with the other remaining hand unlatch the snap fastener preparatory to impaling the fish thereon. This task is magnified if the fisherman happens to be handicapped through the loss of one or more of his fingers on the hand utilized in attempting to open the fastener. In such instances it is almost an impossibility for the fisherman to release such a fastener in order to permit impalement of the fish thereon. My invention is directed toward eliminating these disadvantages.

It is a general object of my invention to provide a novel and improved fish fastener of inexpensive and simple construction and operation.

A more specific object is to provide a novel and improved fish fastener which can be applied with a minimum of effort and inconvenience.

Another object is to provide a novel and improved fish fastener constructed so that the fish impaling portions thereof support each other and at the same time have an inherent self-locking feature.

Another object is to provide an improved fish fastener constructed so that it may be easily, positively and conveniently grasped with one hand and opened thereby without delay.

Another object is to provide a novel and improved fish fastener having a self-locking feature which will cause the fish impaled thereon to be held more securely as the amount of pull exerted thereon by the fish increases.

A further object is to provide a novel and improved fish fastener, the fish securing portions of which are constantly and resiliently urged toward each other and are so shaped as to hold the fish impaled thereon in a more effective manner.

These and other objects and advantages of my invention will more fully appear from the following description made in connection with the accompanying drawings wherein like reference characters refer to similar parts throughout the several views and in which.

Figures 1, 2, 3:
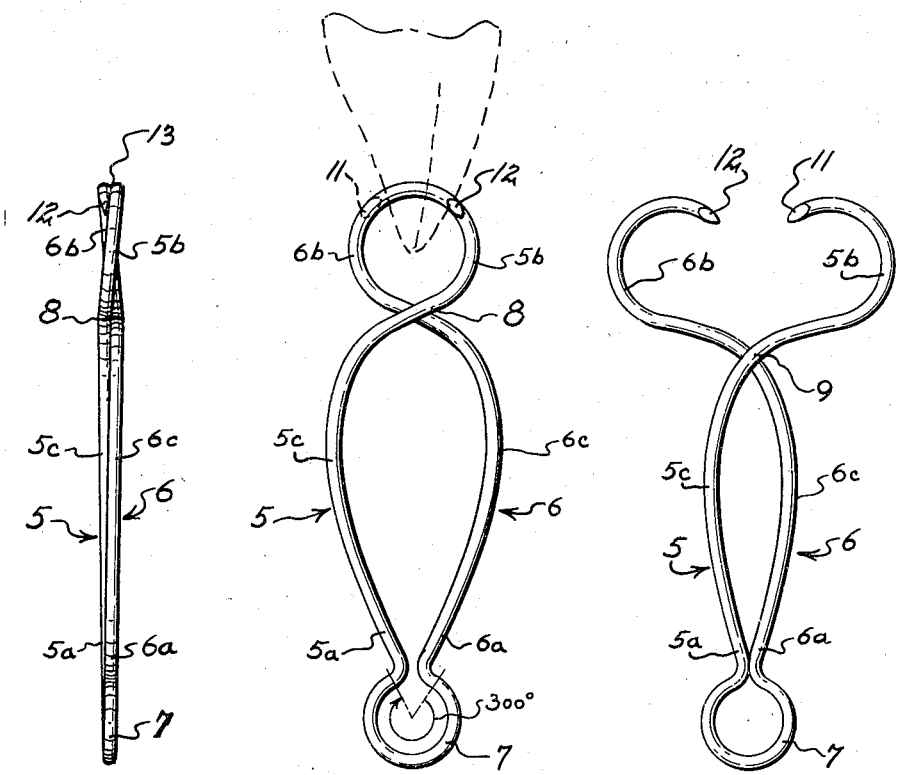
Fig. 1 is a side elevational view of one embodiment of my invention in closed position and having a fish (shown fragmentarily in elevation) impaled thereon.
Fig. 2 shows the same fish fastener in open position.
Fig. 3 is an edge elevational view of the same in closed position.

One embodiment of my invention as shown in Figs. 1–3 may include a pair of opposite and crossed rigid limb members indicated generally as 5 and 6. These limb members 5 and 6 have rearward end portions 5a and 6a and forward free end portions 5b and 6b. They also have intermediate portions 5c and 6c. The rearward end portions 5a and 6a are connected by a spring metal loop member 7 which defines an arc of approximately 300° and resiliently urges the forward end portions 5b and 6b toward each other. This loop member 7 is constructed to resist the movement of the rearward end portions 5a and 6a and the intermediate portions 5c and 6c toward each other. The intermediate portions 5c and 6c cross each other as at 8 when in closed position and as at 9 when in open position.

The forward end portions 5b and 6b reverse upon themselves in an arcuate shape as best shown in Figs. 1 and 2 and the extreme ends thereof are sharpened as at 11 and 12. As best shown in Fig. 1 these arcuately shaped forward end portions overlie each other when in closed position and define a substantially circular arc. When in closed position these free end portions 5b and 6b lie in close proximity to each other as shown at 13 in Fig. 3 so that the rigidity of each supports the other. These sharpened ends 11 and 12 pass beyond the other when moving from open to closed position and extend rearwardly toward the loop member 7 at all times.

Fig. 2 shows the fish fastener in open position. This position is attained by compressing within the hand of the user the intermediate portions 5c and 6c thereby causing the forward end portions 5b and 6b to separate and move apart to permit the mouth defining portions of the fish to be inserted between the sharpened ends 12 and 11. When the intermediate portions 5c and 6c are released, sharpened ends 12 and 11 will pierce these portions of the fish and pass therethrough as shown in Fig. 1.

It should be noted that my fish fastener may be applied to a fish so as to have a fish impaled thereon through the use of a single hand of the user. Because of the outward bowing of the intermediate portions 5c and 6c, it is a simple matter for the user to cause the forward end portions 5b and 6b to separate preparatory to impaling a fish thereon. There is no possibility of the fastener slipping or springing from the hand of the user as has been the case with the safetypin type of fastener wherein the fingers of the user must be utilized to guide the movable portions of the fastener laterally in order to open the fastener. In the use of my fastener the user merely releases the pressure of his hand upon the intermediate portions 5c and 6c whereupon the urging of the loop member 7 will cause the end portions to impale the fish thereon.

It should also be noted that the forward end portions 5b and 6b pass on opposite sides of each other relative to the sides upon which the intermediate portions 5c and 6c pass. In other words, the intermediate portion 5c as shown in Fig. 1 is adjacent to the viewer whereas the free end portion 5b lies behind the end portion 6b adjacent the fish impaling portions. Thus it can be readily seen that a much more rigid and sturdy fish fastener is provided by crossing the opposite members at two points in their construction. It will be readily seen that the free end portions 5b and 6b tend to support each other as do the intermediate portions 5c and 6c at the fish impaling portions and at the point 8.

Another advantage of my fish fastener is the fact that it is constructed so as to provide a self-locking feature. It will be noted that the sharpened ends 11 and 12 each extend rearwardly toward the loop member 7 so that the harder the fish pulls upon the forward end portions 5b and 6b the more securely it will be held.

It should also be noted that my fish fastener is substantially more rigid and sturdy because the fish impaling portions 5b and 6b are reversed upon themselves. Moreover, the support given by each of the forward end portions 5b and 6b to the other because of the fact that they pass in close proximity behind each other provides added sturdiness to the fastener.

Another advantage of my fish fastener is that it can be so cheaply manufactured and is so simple to use. It will be readily appreciated that a plurality of these fasteners may be secured to the links of a metal chain in the manner well known in the art by merely passing one link of the chain rearwardly around one of the crossed limbs 5 or 6 into the loop member 7 as best shown in Figure 2. In other words, the loop member 7 not only functions to provide the necessary resilience to hold the fish securely, but also functions as a securing means for securing the fish fastener at various points along the length of a chain or other type of securing line.

It will, of course, be understood that various changes may be made in the form, details, arrangement and proportions of the parts without departing from the scope of my invention which consists of the matter shown and described herein and set forth in the appended claims.

What I claim is:

1. A live fish fastener comprising a pair of opposed and crossed limb members extending substantially in a single plane throughout having corresponding rear-end portions and having corresponding forward free end portions movable relative to each other between open and normally closed positions, said free end portions being reversely curved and sharpened at their extreme outer ends and extending when in closed position in superimposed overlapping substantially concentric relation and resilient means connecting the rear end portions of said limb members and constantly urging their free end portions toward closed position, each of said free end portions being curved inwardly toward the other and extending past the other in close proximity thereto when in closed position to cooperate therewith to firmly hold a fish impaled thereon.

2. The structure of claim 1 wherein said free end portions are curved throughout their length.

3. The structure of claim 1 wherein each of said sharpened free ends as it moves from open to closed position passes a substantial distance beyond the longitudinal center of the fastener.

4. The structure of claim 1 wherein each of said sharpened ends when in closed position extends an appreciable distance rearwardly of the forwardmost portion of the fastener whereby any pull by a fish impaled on said free end portions will tend to lock the fastener in closed position.

References Cited in the file of this patent

UNITED STATES PATENTS

| 217,719 | Wood | July 22, 1879 |
| 417,590 | Schloss | Dec. 17, 1889 |
| 511,238 | Hieatzman | Dec. 19, 1893 |
| 872,934 | Harig | Dec. 3, 1907 |
| 2,145,313 | Morley | Jan. 31, 1939 |
| 2,284,004 | McCurdy | May 26, 1942 |

FOREIGN PATENTS

| 21,872 | Great Britain | 1903 |